(12) United States Patent
Manneschi

(10) Patent No.: US 7,793,533 B2
(45) Date of Patent: Sep. 14, 2010

(54) TEST DEVICE FOR METAL DETECTOR PORTAL STRUCTURE

(76) Inventor: Alessandro Manneschi, 15, via XXV Aprile, I-52100 Arezzo (IT)

( * ) Notice: Subject to any disclaimer, the term of this patent is extended or adjusted under 35 U.S.C. 154(b) by 997 days.

(21) Appl. No.: 11/484,245

(22) Filed: Jul. 10, 2006

(65) Prior Publication Data
US 2007/0007954 A1 Jan. 11, 2007

(30) Foreign Application Priority Data
Jul. 11, 2005 (FR) .................................. 05 07373

(51) Int. Cl.
*G01D 18/00* (2006.01)
(52) U.S. Cl. ........................................................ 73/1.01
(58) Field of Classification Search ................. 211/162, 211/187, 191, 207; 73/1.01
See application file for complete search history.

(56) References Cited

U.S. PATENT DOCUMENTS

| | | | | |
|---|---|---|---|---|
| 865,268 | A * | 9/1907 | Powell ........................... 211/27 |
| 3,776,030 | A * | 12/1973 | Strimel ......................... 33/788 |
| 4,500,146 | A * | 2/1985 | Peterson ..................... 312/257.1 |
| 4,672,837 | A * | 6/1987 | Cottrell, Jr. .................. 324/202 |
| 5,474,412 | A * | 12/1995 | Pfeiffer et al. ............... 414/276 |
| 5,520,292 | A * | 5/1996 | Lombardi .................... 211/85.6 |
| 5,672,807 | A * | 9/1997 | Gonsalves ................... 73/65.01 |
| 5,785,189 | A * | 7/1998 | Gollob et al. ................. 211/187 |
| 5,994,897 | A * | 11/1999 | King ............................ 324/236 |
| 6,062,401 | A * | 5/2000 | Hall et al. ..................... 211/187 |
| 6,302,280 | B1 * | 10/2001 | Bermes ......................... 211/70.6 |
| 6,382,435 | B1 * | 5/2002 | Legaz et al. ................... 211/207 |
| 6,516,958 | B2 * | 2/2003 | Tyski ............................ 211/186 |
| 6,696,947 | B1 * | 2/2004 | Bybee ........................... 340/551 |
| 6,741,463 | B1 * | 5/2004 | Akhtar et al. ............ 361/679.41 |
| 6,877,826 | B2 * | 4/2005 | Wood et al. .................. 312/205 |
| 6,895,869 | B2 * | 5/2005 | Lai ............................. 108/50.02 |
| 7,017,760 | B2 * | 3/2006 | Zuclich et al. ................ 211/187 |
| 7,145,328 | B2 * | 12/2006 | Manneschi ................... 324/228 |
| 2004/0140798 | A1 * | 7/2004 | Manneschi ................... 324/239 |
| 2004/0194670 | A1 * | 10/2004 | Lai ............................. 108/50.02 |
| 2004/0256341 | A1 * | 12/2004 | Donnell et al. ............... 211/187 |

FOREIGN PATENT DOCUMENTS

| | | |
|---|---|---|
| AU | 562 089 B2 | 5/1987 |
| EP | 1 394 570 A1 | 3/2004 |
| FR | 2 067 937 | 8/1971 |
| FR | 2 516 251 | 5/1983 |
| FR | 2598173 A1 * | 11/1987 |
| FR | 2 610 417 | 8/1988 |
| FR | 2 697 919 | 5/1994 |
| FR | 2 698 178 | 5/1994 |
| FR | 2 720 519 | 12/1995 |
| IT | 1214991 | 1/1990 |
| IT | 1216946 | 3/1990 |
| IT | 1249278 | 2/1995 |

* cited by examiner

*Primary Examiner*—John Fitzgerald
(74) *Attorney, Agent, or Firm*—Blakely, Sokoloff, Taylor & Zafman LLP

(57) ABSTRACT

This invention relates to a test device for metal detector portal structure, characterized by the fact that it comprises a removable rack (10) comprising support and guide means (300) for displacement of a panel (400) capable of carrying a reference sample.

41 Claims, 15 Drawing Sheets

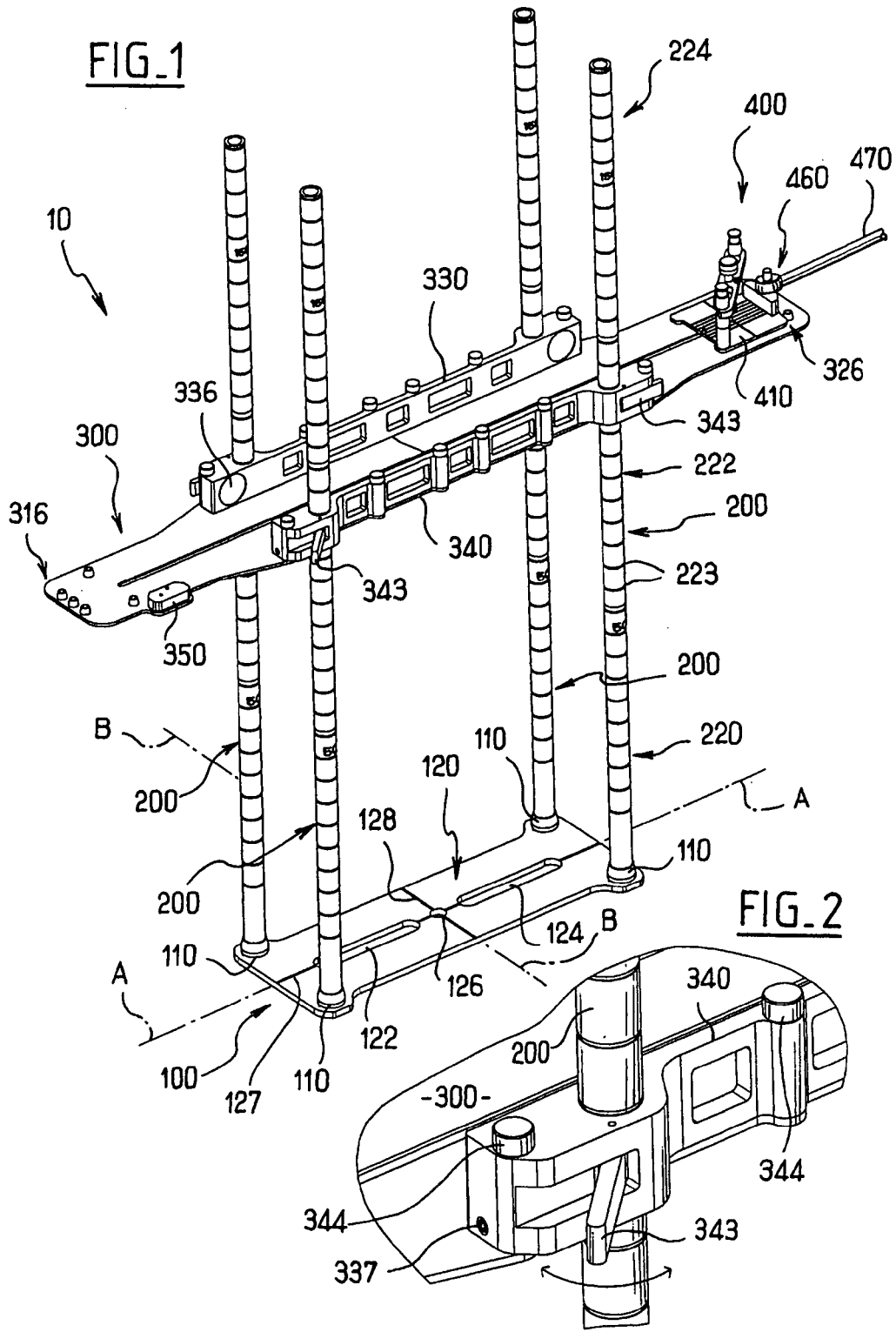

Figure 5:
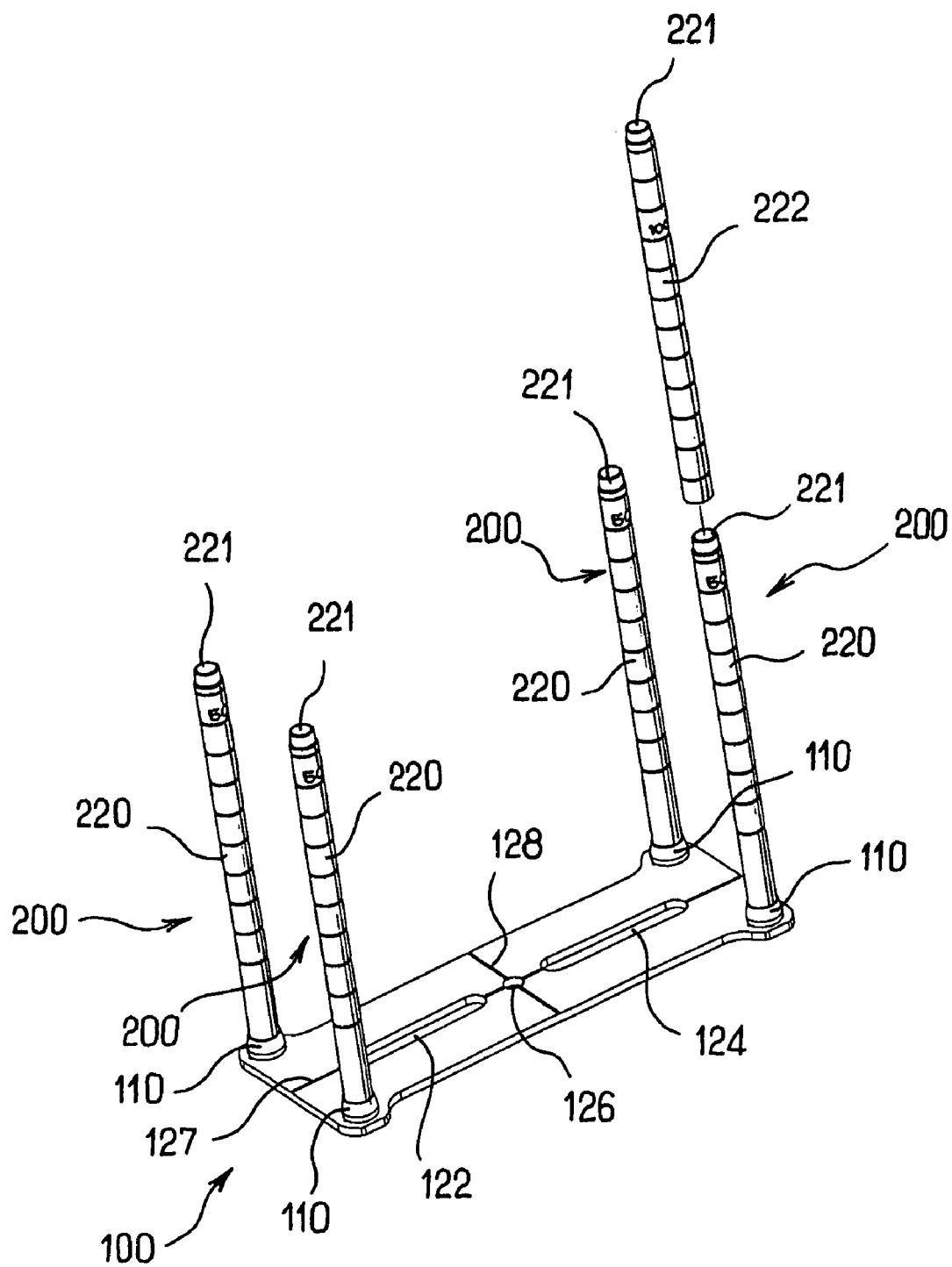
Figure 6:
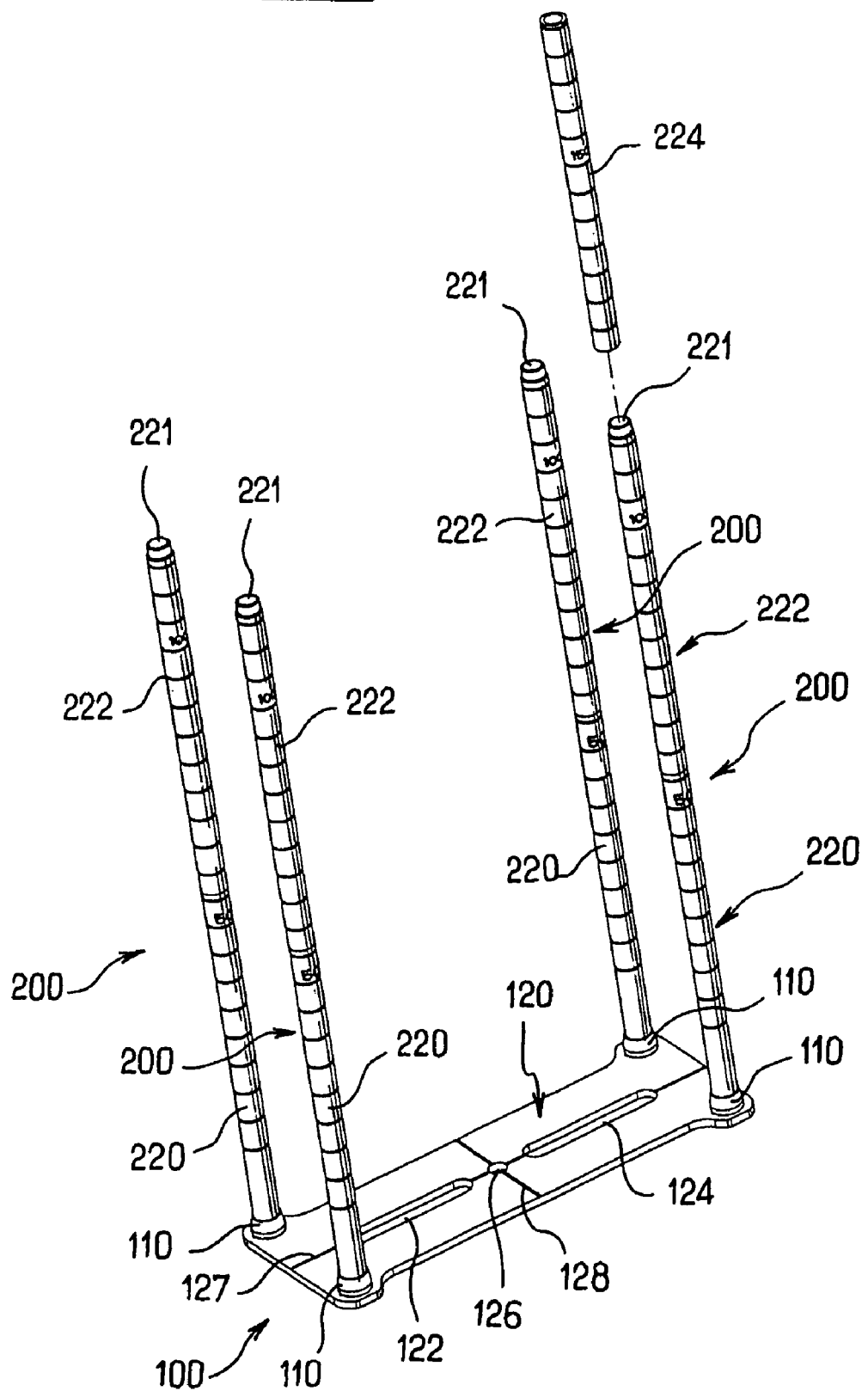
Figure 7:
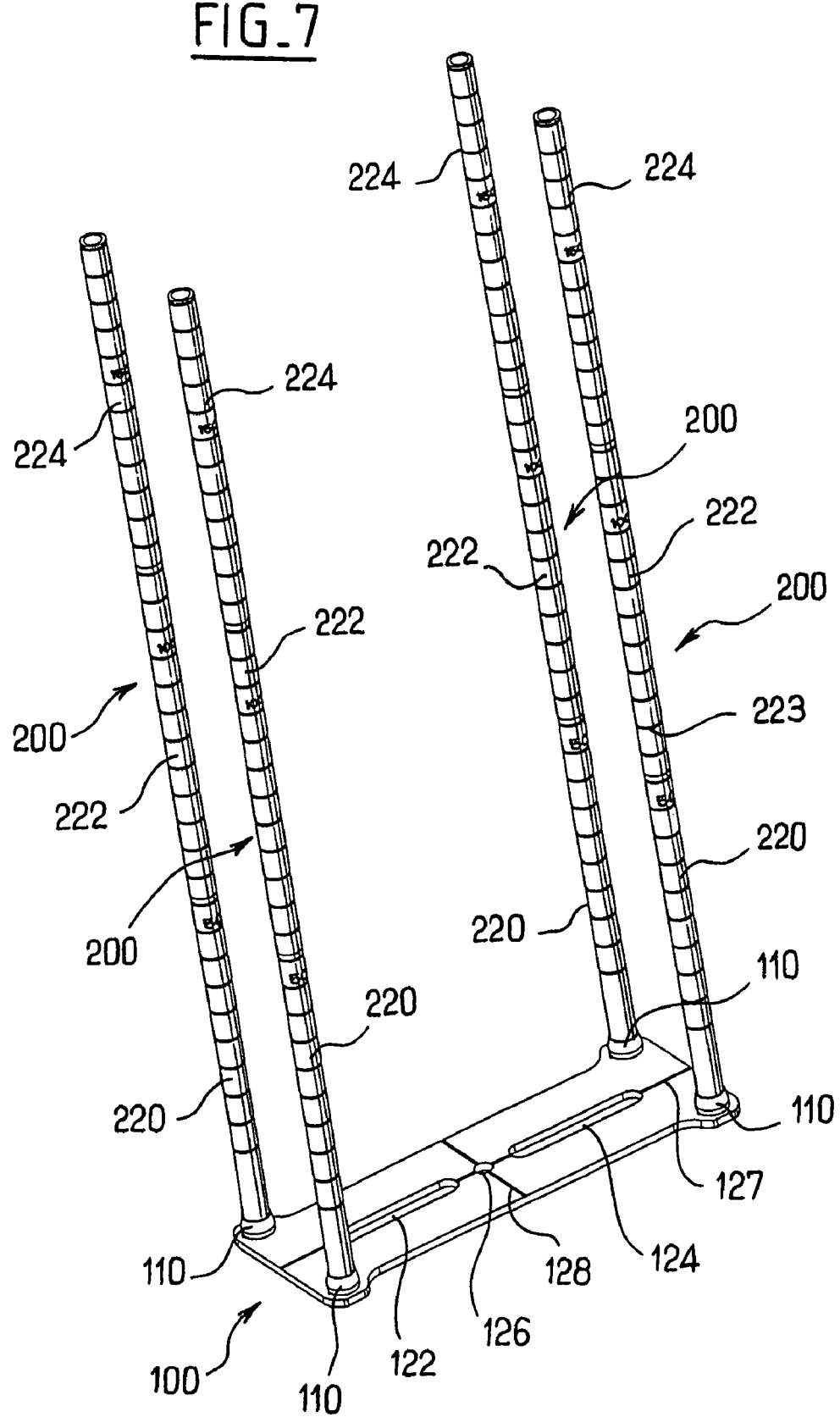

FIG_3
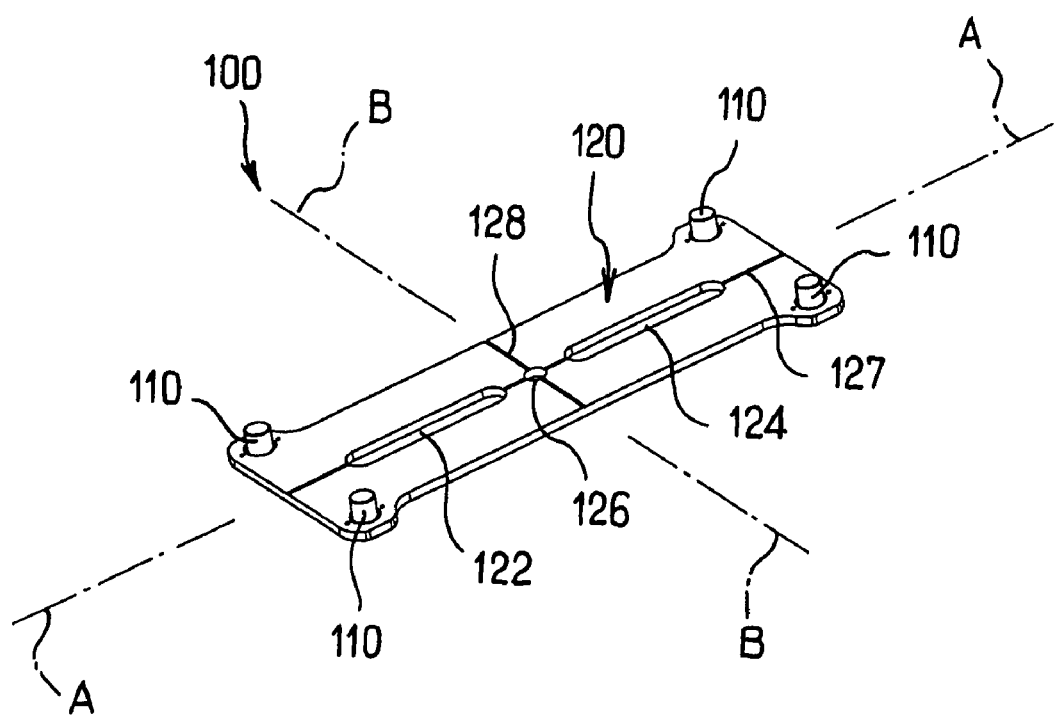

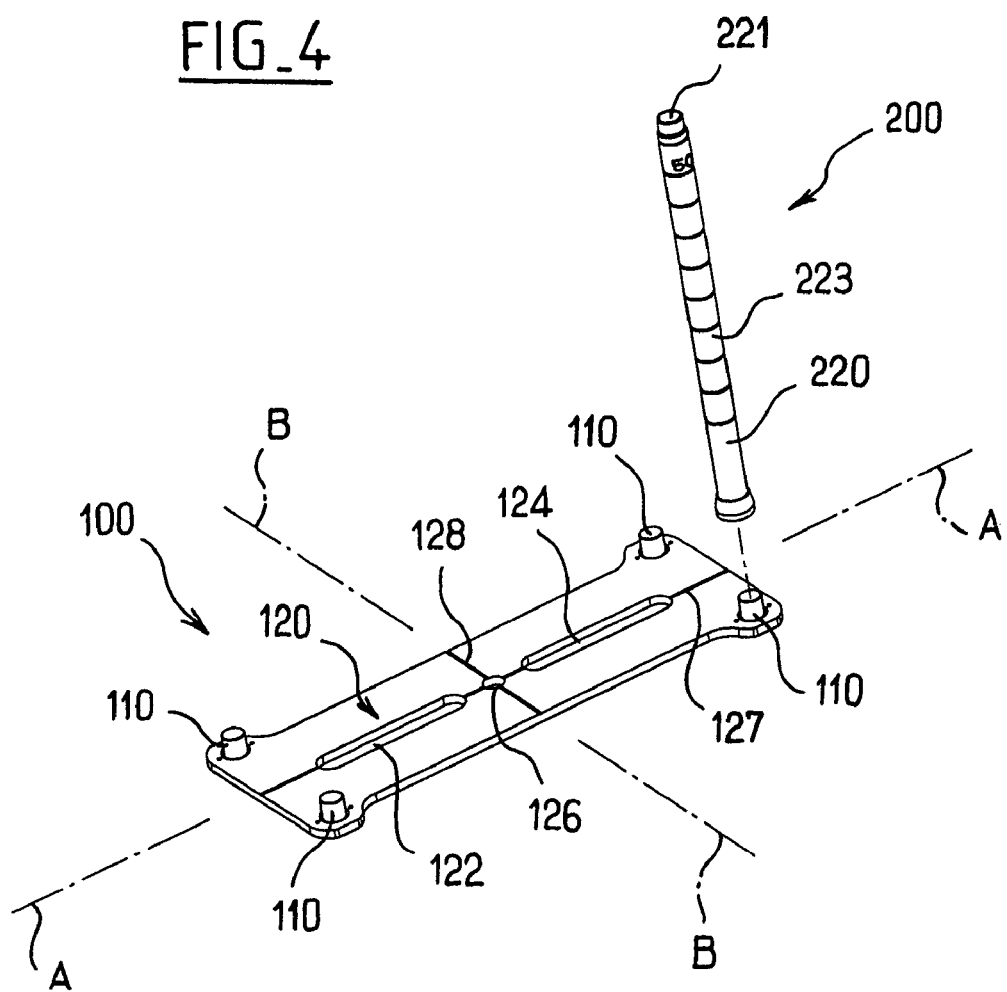

FIG_6

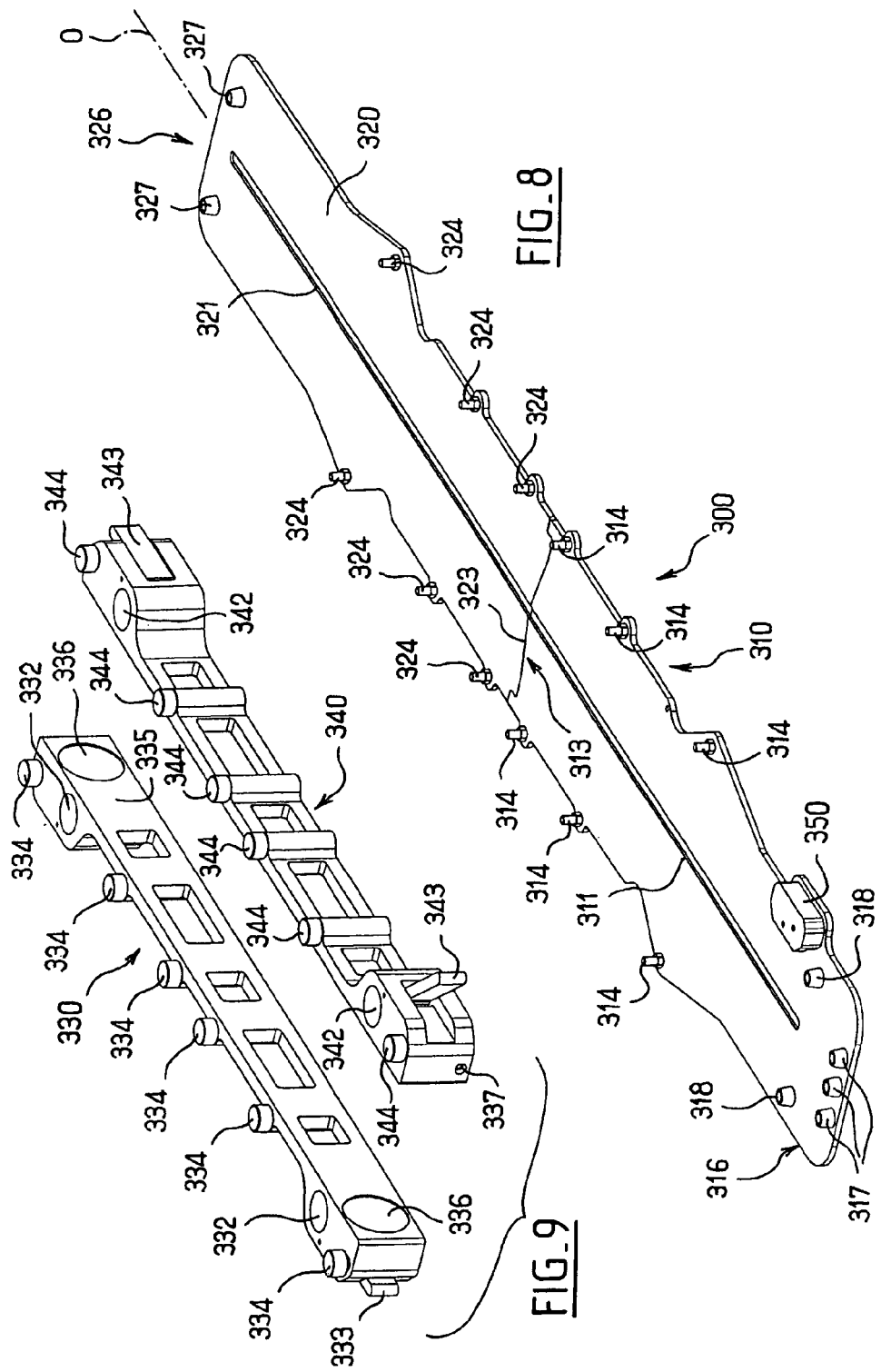

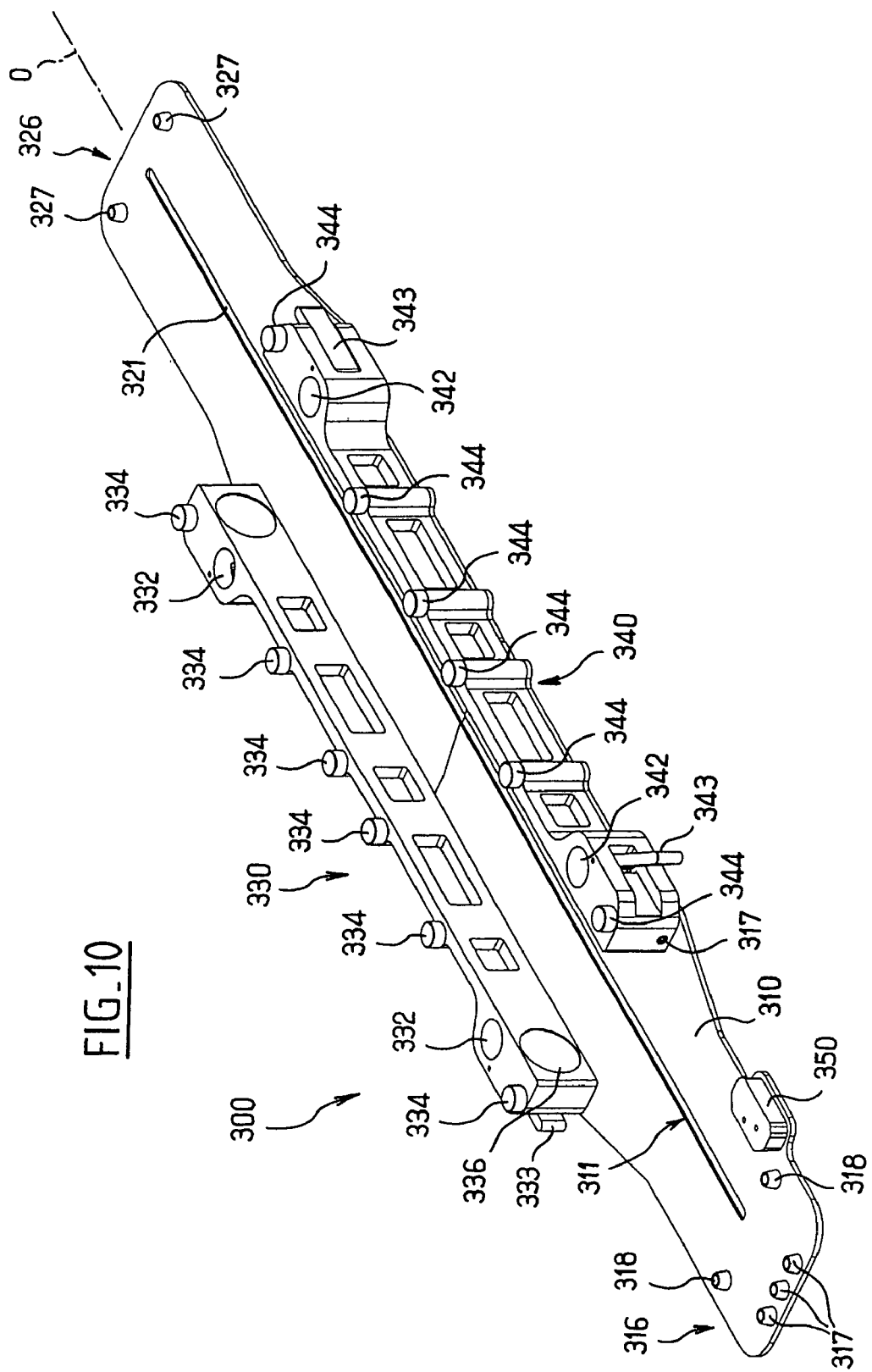
FIG_10

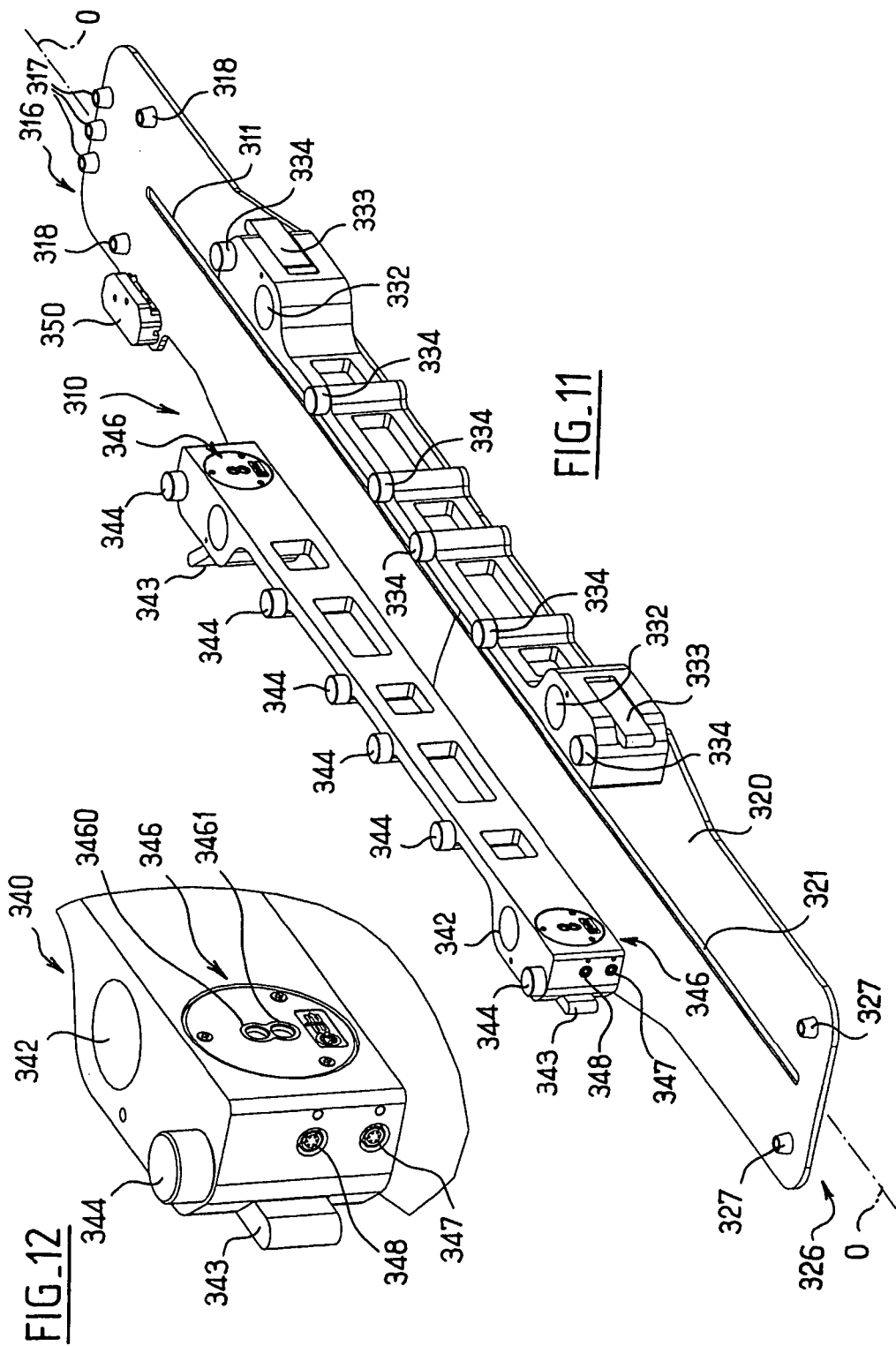

FIG_14

FIG_19
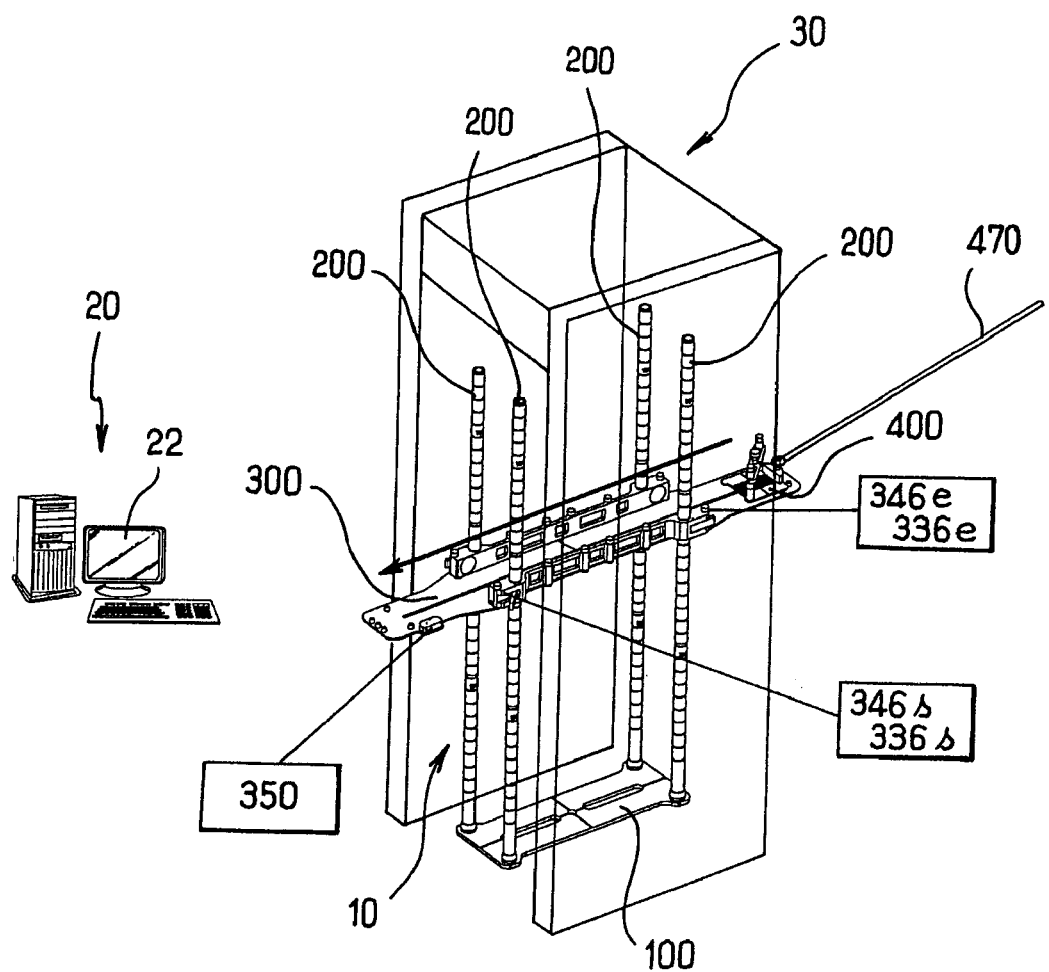

TEST DEVICE FOR METAL DETECTOR PORTAL STRUCTURE

This invention relates to the domain of metal detectors.

This invention is particularly applicable to metal detectors intended for controlling access to sensitive environments such as airports, banks, embassies, military installations, etc., although this list is not limitative.

It is known that most metal detector systems proposed in this context comprise emitting coils, receiving coils and an electronic processing circuit suitable for detecting variations of signals received on receiving coils from a reference value.

These detectors usually are in the global form of a portal structure or tunnel through which persons, or even equipment to be checked pass.

Example embodiments of known detectors are given in documents FR-A-2720519, FR-A-2773350, FR-A-2516251, FR-A-2610417, FR-A-2607937, FR-A-2697919, FR-A-2698178 et FR-A-2698968, IT 1271382, IT 1216946, IT 1260208, IT 1249278, IT 1214991 and FN 913502.

Known detectors have given good service.

However, they do not always give satisfaction.

In particular, it is relatively difficult to check correct operation and/or settings of these detectors. In particular, it is usually difficult to verify that detectors have sufficient sensitivity due to the variety of dangerous objects to be detected that are widespread nowadays.

However, at least in some countries, standards now require a series of precise tests that have to be carried out during installation of the detector, or even at regular intervals or even during maintenance operations.

In practice, persons responsible for installations are often obliged to carry out manual detection and sensitivity tests by manually submitting various prototypes of objects that might be detected, for example knife blades with various geometries and dimensions. These operations are painstaking and difficult to carry out precisely and repetitively manually. They require the passage of many prototypes with a wide variety of orientations with respect to the emitting and receiving coils.

Document EP-A-1394570 describes a metal detector comprising receiving coils and an electronic processing circuit suitable for detecting variations of signals received on receiving coils, from a reference value, also comprising a test module that comprises selection means capable of detecting a test request, and inspection means used during detection of a test request by selection means, capable of comparing signals output from the receiving coils during the subsequent passage of a known standard reference object with a predetermined response.

However, the means described in this document EP-A-1394570 always require fairly complex manual manipulation of the known standard reference object.

Document U.S. Pat. No. 4,672,837 proposes to test a metal detector by suspending a cable or equivalent means from the top cross-piece of a detector gateway, attaching an object with a mass, size and material that simulate a weapon at a chosen height on the cable, making the object thus suspended oscillate and detecting the response provoked at the detector.

The purpose of this invention is to propose means of improving the situation.

This purpose is achieved within the framework of this invention by means of a test device for a metal detector portal structure characterised by the fact that it comprises a removable rack consisting of the combination of a base, a plurality of columns, a tray supported by the columns and adjustable in height on the columns and a panel free to move on the tray capable of carrying a reference sample, the rack also comprising support and guide means for displacement of the panel on the tray.

According to another advantageous characteristic of this invention, the above mentioned rack comprises at least one electrical connector suitable for connecting the said rack and more precisely the sensors carried by the said rack, to a microcomputer or to a calculation and processing unit integrated to a metal detector portal structure. This connection serves two purposes, firstly it provides a sequence of manipulation instructions for an operator output by the microcomputer or the calculation unit integrated into the portal structure, and secondly to record and process information output from sensors supported on the rack.

Figure 13:
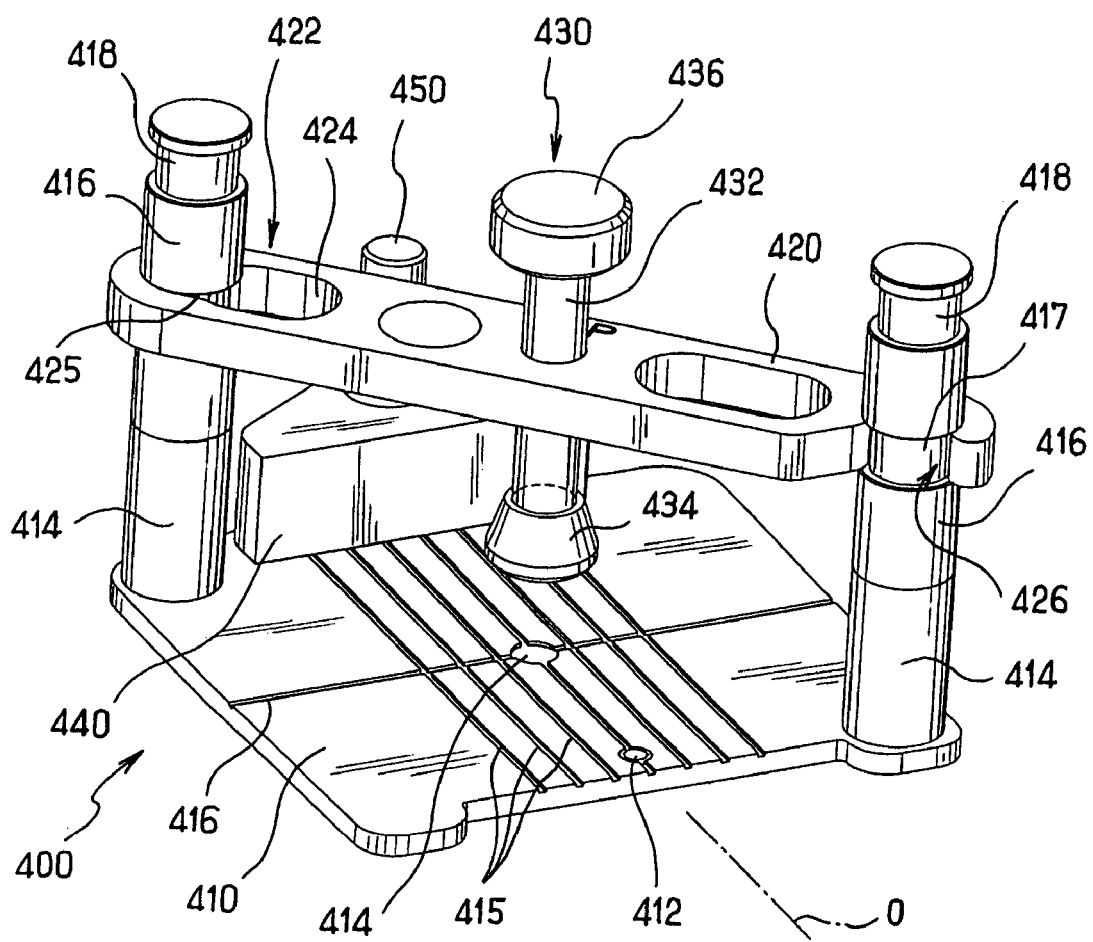
Figure 14:
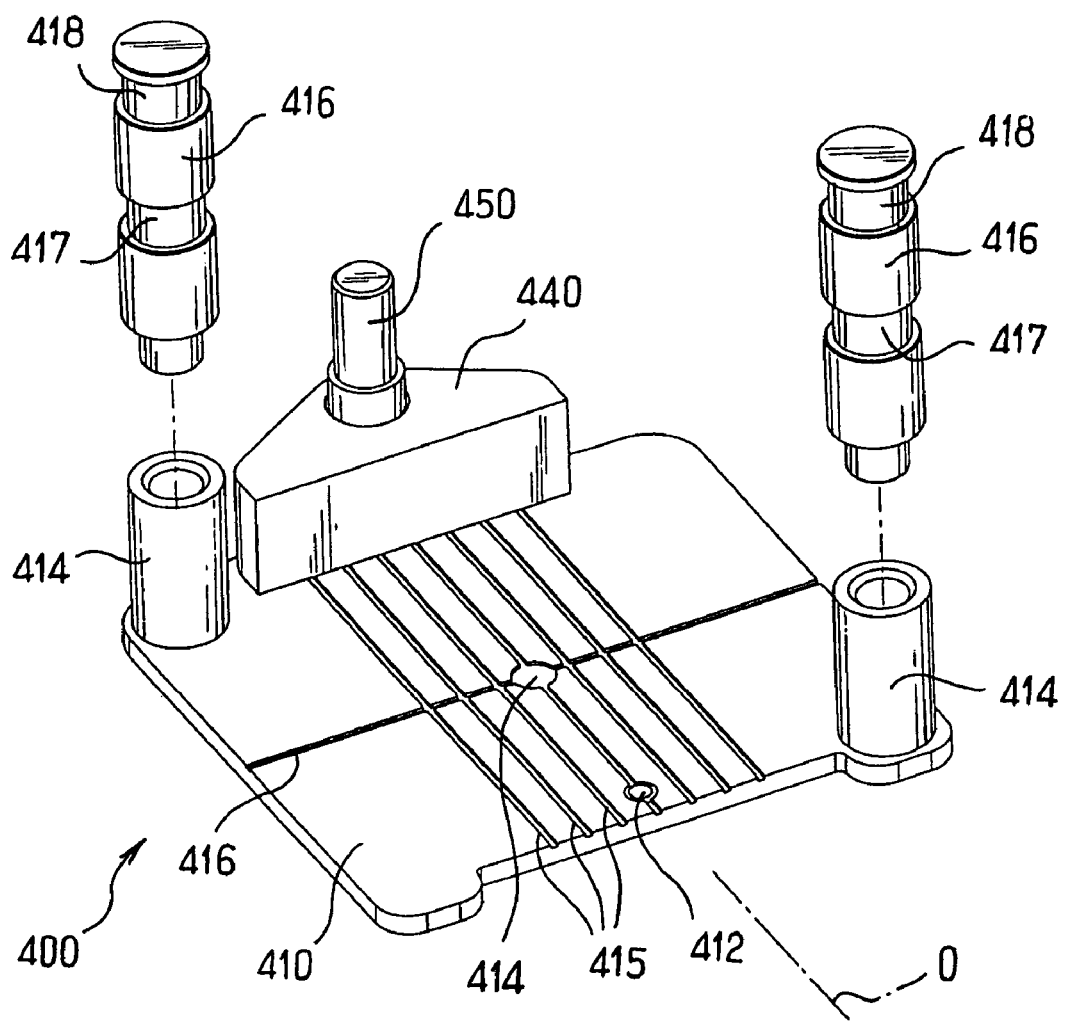
Figure 15:
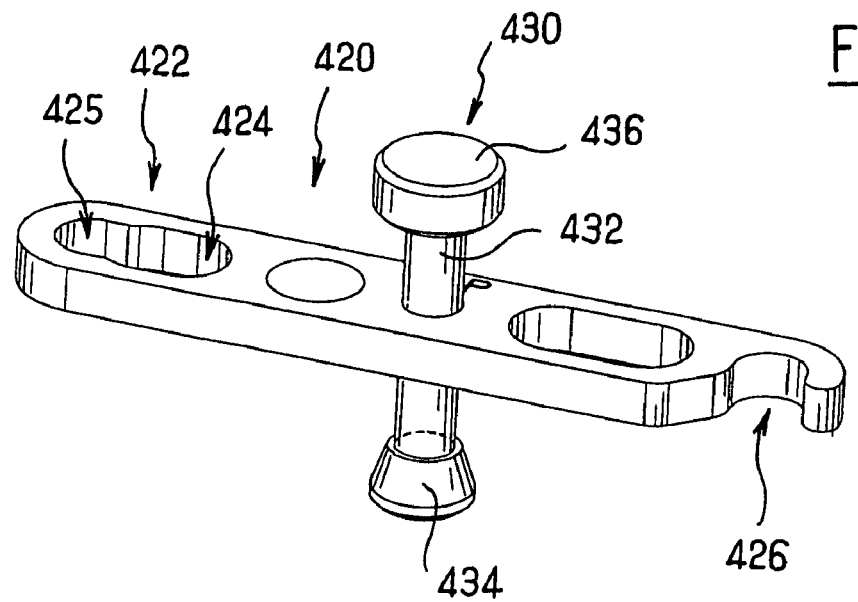
Figure 16:
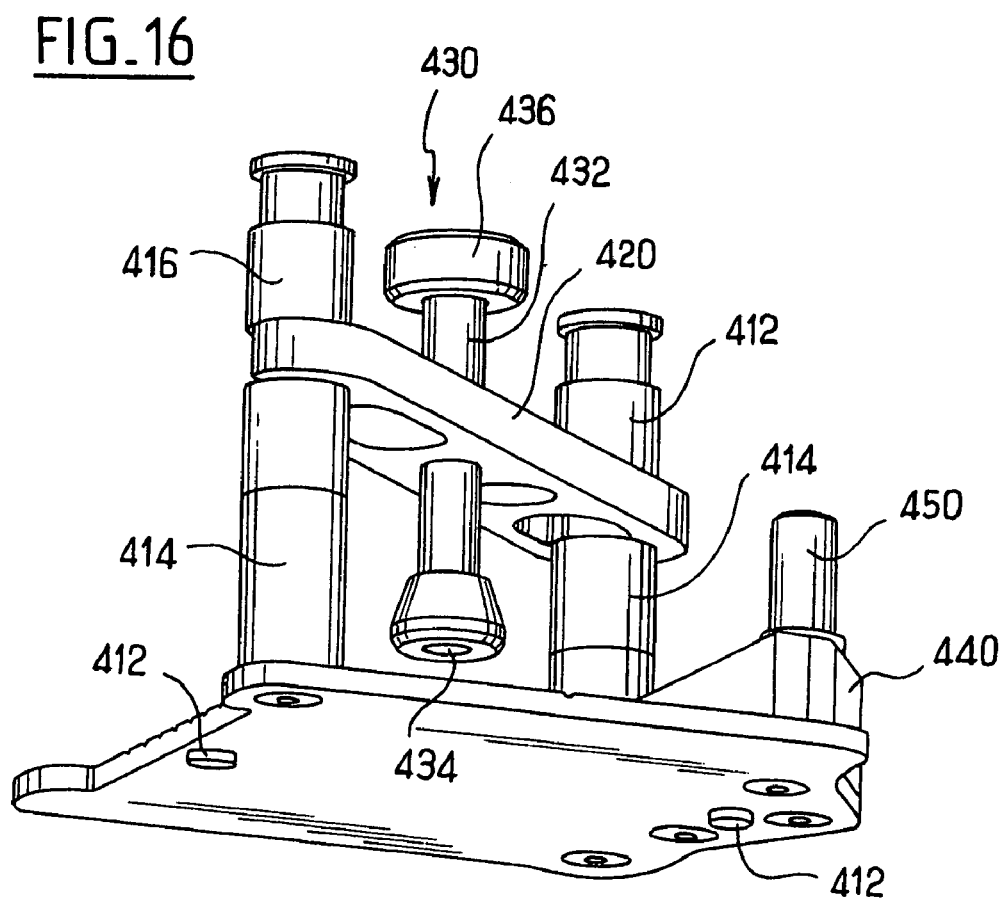
Figure 17:
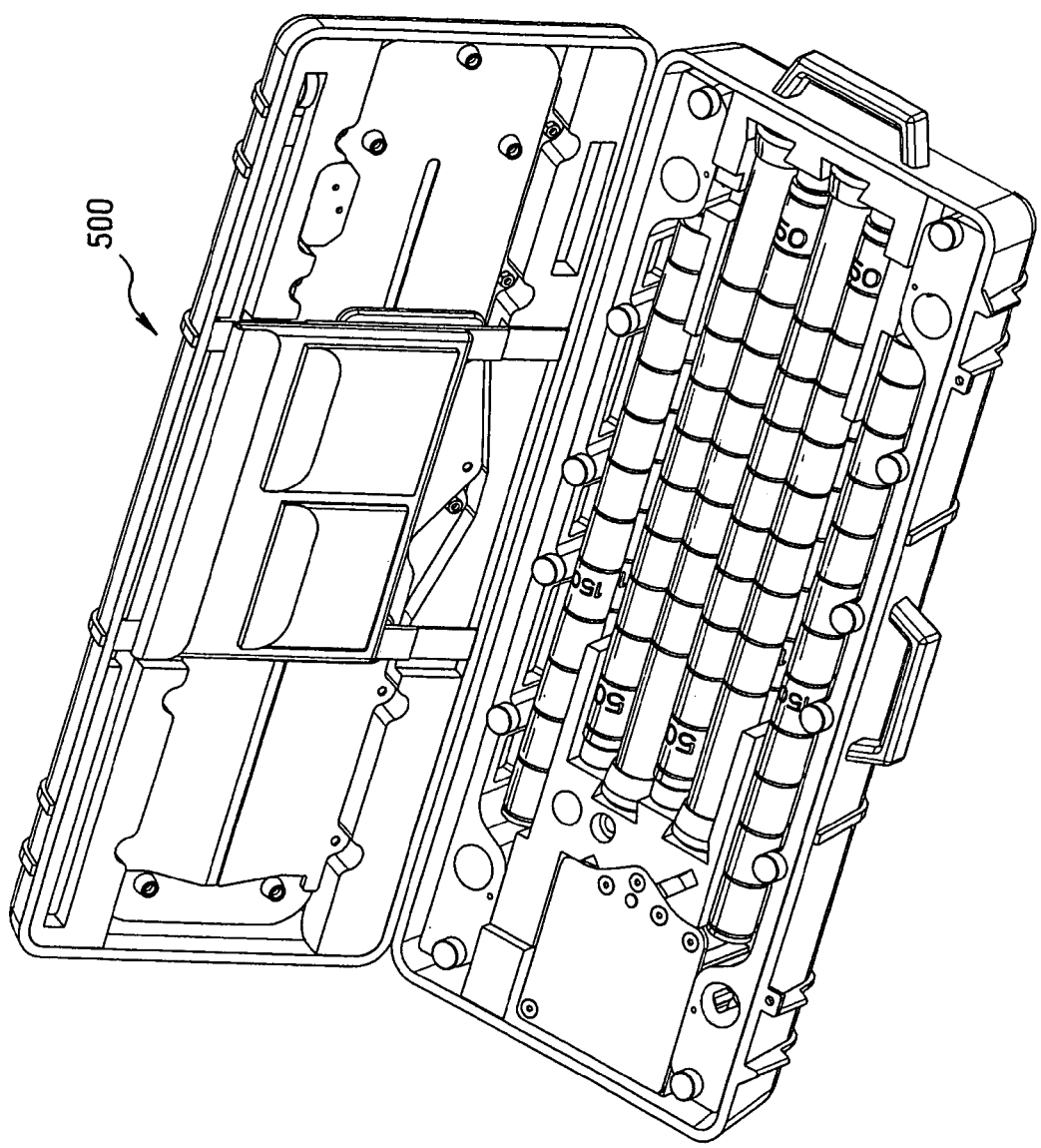
Figure 18:
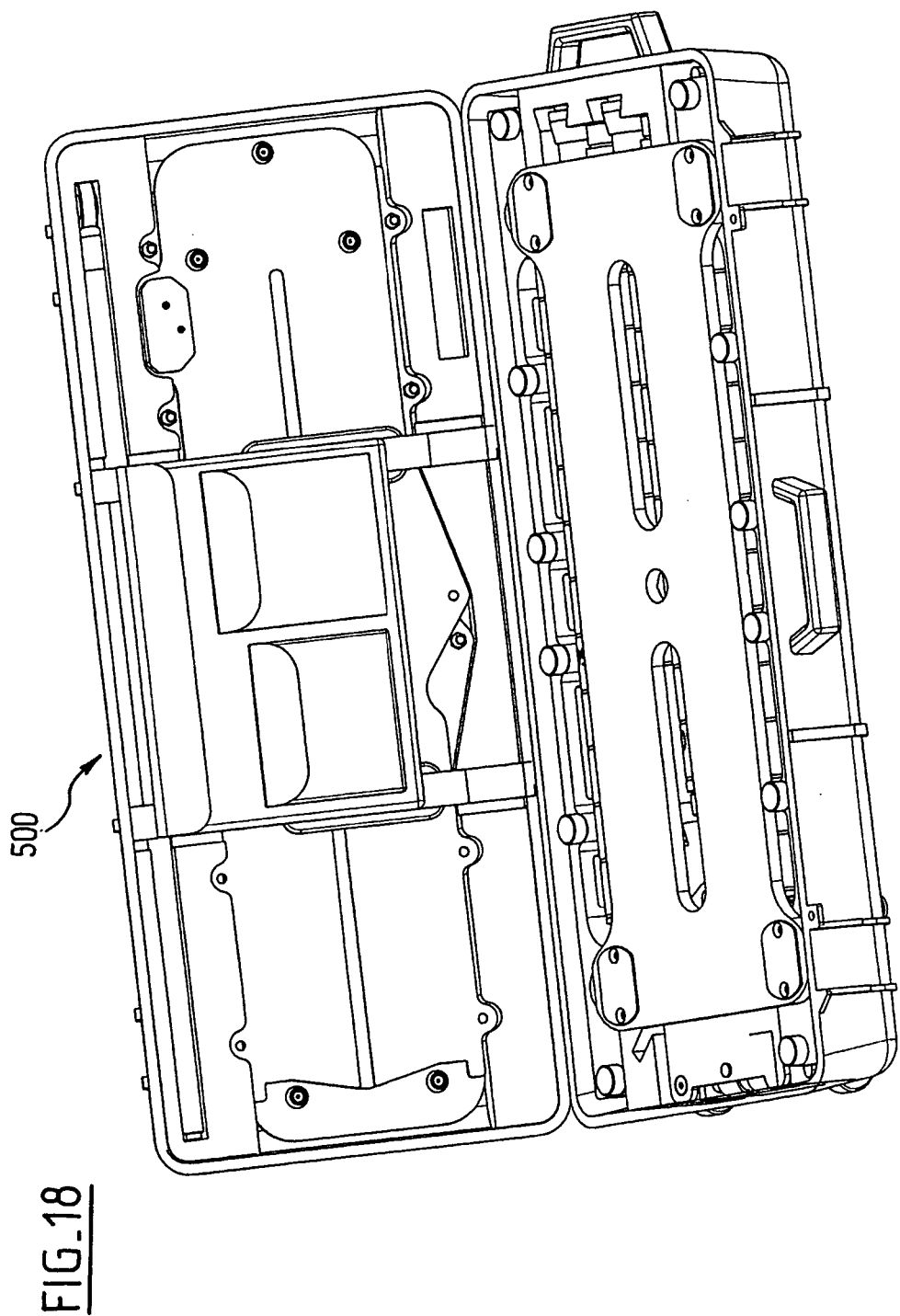

Other characteristics, purposes and advantages of this invention will become clear after reading the following detailed description, with reference to the appended drawings given as non-limitative examples, wherein:

FIG. 1 shows a perspective diagrammatic view of a removable rack according to this invention, FIG. 2 shows a partial view of a subassembly of the same rack at an enlarged scale showing means of locking a tray on vertical columns at a chosen height, FIG. 3 shows a perspective diagrammatic view of a base, FIGS. 4, 5, 6 and 7 show the successive assembly of different segments of columns on the base, FIG. 8 shows a perspective view of a tray made by the assembly of two complementary panels, FIG. 9 shows a diagrammatic perspective view of two side elements or boards of the tray, FIG. 10 shows a complete view of the assembled tray, FIG. 11 shows a second view of the same tray, FIG. 12 shows a partial view of a sensor and associated connectors integrated on a side element of the tray, at an enlarged scale, FIG. 13 shows a perspective view of a panel conforming with this invention, FIG. 14 diagrammatically shows steps in assembly of the said panel, FIG. 15 shows an element or cross-piece of the panel conforming with this invention, FIG. 16 shows another perspective view of a panel conforming with this invention, FIGS. 17 and 18 diagrammatically illustrate the possibility of storing all means forming part of the deformable rack in conforming with this invention, in a case for transport purposes, and FIG. 19 diagrammatically shows a complete assembly of the detector system conforming with this invention comprising a rack 10 and a microcomputer 20 associated with a metal detector 30.

We will now describe the structure of the removable rack according to a preferred but non-limitative embodiment of this invention.

The rack 10 illustrated in the appended figures consists essentially of the combination of a base 100, vertical poles or columns 200, a horizontal tray 300 supported by columns 200 and adjustable in height on the columns and a panel 400 free to move on the tray 300.

Preferably, within the framework of this invention, all or at least most of the parts making up the above mentioned elements (base 100, columns 200, tray 300 and panel 400) are made from a thermoplastic material. This material is neutral with respect to magnetic and electrical fields and consequently does not disturb operation of the metal detector portal structure during execution of the test sequences.

The base 100 will be placed on the floor. It is formed from a plane rectangular panel. The base 100 comprises means 110 of receiving the base or the lower end of the columns 200. A large number of embodiments of such means can be made. According to the non-limitative embodiment shown on the appended figures, these means 110 are composed of projecting pins. Thus, a distinction is made in FIG. 3 between four projecting pins 110 on the upper surface of the base 100 close to the corners of the base.

The base 100 also comprises means 120 forming an orientation marker so as to achieve precise orientation and positioning of the rack 10 with respect to a metal detector frame.

A large number of embodiments of these marker means 120 can be made.

They are typically designed to facilitate centring of the rack with respect to the metal detector frame.

According to the non-limitative embodiment shown in the appended figures, the base 100 also comprises a transverse cut so that the base 100 can be positioned with respect to the marks provided on the ground at the metal detector portal structure. Even more precisely, according to the embodiment shown on the appended figures, the base 100 thus comprises 2 straight cut-outs 122, 124 aligned along the longitudinal median major axis A of the base 100.

The base 100 also comprises a central circular cut-out 126 between the two above mentioned cut-outs 122, 124.

The base 100 also comprises straight grooves or engravings 127, 128 forming positioning marks. In the embodiment shown in the appended figures, there are also two straight grooves 127, 128 orthogonal to each other on the upper surface of the base 100. The two grooves 127, 128 are aligned on the major longitudinal axis A and the minor transverse axis B median to the base 100.

As a non-limitative example, the base 100 is about 770 mm long and about 300 mm wide.

Many different embodiments of columns 200 may also be made.

Each column 200 is preferably formed by the assembly of several tubular segments, to enable easy storage in a reasonably sized case as will be described below with reference to the appended FIGS. 17 and 18. According to the embodiment shown on the appended figures, each column 200 is thus composed of three tubular segments 220, 222, 2224 adapted to be assembled coaxially. As a non-limitative example, each column 200 is thus composed of a lower segment 220 that is 55 cm high, an intermediate segment 222 that is 60 cm high, and an upper segment 224 that is 60 cm high, to give a total height of 175 cm once assembled.

The different segments 220, 222, 224 comprise mutual cooperation means at their ends for a perfectly coaxial assembly in pairs, and on the lower end of the first segment 220 there are means of cooperation with the complementary means, for example pins 110, provided on the upper surface of the base 100. Different embodiments of these cooperation means may be made. Recesses are preferably formed at one end of the segments 220, 222, 224, and complementary pins such as references 221 on the appended figures are formed at the other end, to enable assembly of the segments.

As can be seen on the appended figures, the different segments 220, 222 and 224 are preferably graduated along their height. Different variants of the graduations are possible. Preferably, the tubular segments 220, 222 and 224 are provided with annular marking every 5 cm, reference 223 and also graduations at heights of 50 cm, 100 cm and 150 cm.

The function of these graduations is to enable easy adjustment of the height of the tray 300.

Once assembled, the plate 300 advantageously has dimensions of the order of 1700 mm to 300 mm.

Nevertheless, once again to enable easy storage in a reasonable sized transport case, the tray 300 is preferably formed by the assembly of two coplanar plates 310 and 320, and two side elements or curtains 330, 340.

In order to enable precise relative positioning between the two plates 310, 320, they are preferably provided with a curved geometry with complementary shapes referenced 313, 323 at the ends 312, 322 that will be assembled.

The two plates 310, 320 are adapted to be fixed and held in a precise relative position, and then form a rigid tray, through side elements or boards 330, 340.

These side elements or curtains are composed of elongated blocks comprising means such as complementary pins or cavities enabling assembly on the plates 310, 320.

Even more precisely, according to the preferred embodiment shown on the appended figures, several threaded screws or cylinders 314, 324 are provided on the upper surface of the plates 310, 320 close to their longitudinal edge, to cooperate with tapped nuts or bushings 334, 344 supported by the side elements 330, 340.

According to one preferred embodiment conforming with this invention, the threaded screws 314, 324, or bushings are permanently fixed on the plates 310, 320 to prevent them from being removed or lost. Similarly, the tapped bushings 334, 344 that are complementary to screws 314, 324 are preferably mounted free to rotate on the side elements 330, 340 so that they can be assembled on screws 314, 324, while being immobilised in translation on the side elements 330, 340 to prevent them from being removed and getting lost.

The plates 310, 320 are preferably provided with means 316, 326 forming a stop that will limit displacement of the panel 400, on their second end making up the external free ends of the tray 300 once assembled.

Means 326 are also preferably provided on the end 326 of the plate 320, forming a stop limiting the direct displacement of the panel 400 in the form of two pins 327 projecting from the upper surface of the plate 320, aligned along a transverse direction of the tray 300.

On its opposite end, the plate 310 is preferably provided with means 316 on its upper surface, to form a stop for a reference object pushed forward from the panel 400 during tests. These means 316 forming a stop thus preferably comprise three pins 317 aligned along a row transverse to the longitudinal direction of the tray 300 and two additional projecting pins 318 located on the inside of the pins 317 from the longitudinal centre line of the tray 300, but nevertheless located at a mutual distance greater than the distance separating the extreme pins 317 mentioned above.

The plate 310 preferably carries a limit stop sensor 350 at the longitudinal edge, close to these means 316 forming a stop. This sensor 350 may be sensitive to passage of the panel 400 or an object carried by or pushed by the sensor. There are several embodiments of the limit stop sensor 350. It is preferably an electrical switch. However, as a variant, the limit stop sensor 350 may be composed of an optical sensor or it may be based on any other physical principle.

The tray 300 also comprises means adapted to immobilise the tray 300 at the chosen arbitrary height on the columns 200. The choice and the adjustment of the height of the tray 300 are facilitated by the presence of markings 223 on the columns. Preferably, the means used to fix the tray 300 on the columns 200 at the required height includes through channels 332, 342 formed in the side elements 330, 340 and with a section complementary to the outside diameter of the columns 200.

The channels 332, 342 are associated with mobile means 333, 343 on the side elements 330, 340 between a release position in which they do not interfere with the internal volume of channels 332, 342 and a working position in which they do interfere with the internal volume of the said channels 332, 342 to bear in contact with the columns 200 and thus immobilise the tray 300 with respect to the columns.

According to the particular embodiment shown on the appended figures, the above mentioned means 33, 343 are formed from eccentric elements mounted free to pivot about vertical axes on the side elements 330, 340.

Furthermore, preferably, the side elements 330, 340 are provided with adapted sensors on their inner surface 335, 345 to detect passage of the panel 400 or a reference object carried by the panel.

Thus, a sensor is preferably provided at each end of a side element 330, 340.

Even more precisely, an optical sensor 346 is preferably provided on each of the two ends of the side element 340. Each optical sensor 346 comprises an optical emitter 3460 and an adjacent optical receiver 3461, associated with a corresponding reflector 336 provided on one of the two ends of the side element 330 facing it. The optical receiver 3461 integrated into the sensor 346 receives the light flow generated by the adjacent emitter 3460 after reflection on the mirror 336, in a conventional manner in itself, as long as no object is inserted on the path separating the optical detector 346 and the reflector 336. On the other hand, when an object is inserted on this path, for example the panel 400 or an object connected to the panel, the optical path is interrupted and this is detected by the optical receiver 3461 integrated into the sensor 346.

The sensor 346/336 detects either the instant at which the panel 400 passes and the reference object supported by it, or the displacement velocity of the object 400 by measuring the time interval separating the passage in front of the two sensors 346, the distance separating the sensors being known precisely.

FIG. 12 appended shows a connector 347 accessible on one end of the side element 340 to be able to connect the optical sensors 346 to a microcomputer or to the calculation and processing system unit of the metal detector portal structure under test. The same FIG. 12 shows another connector 348 enabling a connection to an auxiliary input of a calculation or processing means (for example of a microcomputer or a portal structure under test). As a non-limitative example, one of the connecting means 347, 348 may be used to make a connection with an analogue output of the detection signal of the metal detector under test, with an alarm relay of the same detector. For example, this connection enables reading of a detection signal when passage of the examined mass is detected on the test device, and memorisation of its amplitude and the triggered state of the alarm, if any.

Similarly, FIG. 2 appended shows a connector 337 used to connect the sensor 350 to a microcomputer or a central calculation and processing unit of the metal detector portal structure.

The tray 300 also comprises guide means, preferably in translation and along the longitudinal axis O-O of the panel 400. There are many different embodiments of this type of translational guide means. Preferably this is achieved by providing the two plates 310, 320 with a groove 311, 321 over a part of their length. After assembly, the two grooves 311, 321 are aligned and are complementary. One opens up into the other. On the other hand, the two grooves 311, 321 do not open up on the free opposite ends of the plates 310, 320, to maintain integrity of these plates.

We will now describe the structure of the panel 400 shown on the appended figures.

The panel 400 comprises a plate 410 comprising complementary guide means of the tray 300. Preferably, these complementary guide means are formed from two pins projecting from the lower surface of the plate 410 and adapted to be engaged in the grooves 311, 321. The two pins reference 412 are visible in FIG. 16.

On its upper surface, the plate 410 comprises means forming a vice or clamp.

According to the particular embodiment shown on the appended figures, the upper surface of the plate 410 carries two pins 414 respectively for this purpose, adjacent to two diagonally opposite corners of the plate 410. Each of these two pins 414 is adapted to hold a pole 416. Preferably, the poles 416 are assembled on the pins 414 using complementary recess/projection type arrangements similar to those used to assemble the segments 220, 222 and 224 of the columns to each other.

The two poles 416 will hold a cross-piece 420 that carries a clamping screw 430. The screw 430 has a threaded body 432 engaged in a complementary tapped reaming formed on the cross-piece 420. The body 402 has a flared end 434 directed towards the upper surface of the plate 410 that will clamp a reference part or object. The body 432 also has a flared thumb wheel at its second end facilitating its manipulation.

Different means may be provided to fix the cross-piece 420 to the poles 416.

Preferably, to achieve this, each pole 416 has two smaller diameter annular grooves 417, 418, distributed over the length of the poles 417, 418 so that the cross-piece 420 will fit at different corresponding pre-adjusted heights. The cross-piece 320 preferably has a longitudinal slot 422 close to a first end, including communicating segments 424, 425. The width of the first segment 424 is greater than the outside diameter of the pole 416 to enable engagement of the cross-piece 420 onto one of these poles. The width of the second segment 425 is complementary to the outside diameter of the grooves 417, 418.

The cross-piece 420 has a cut-out or groove 426 at its second end that opens up sideways on the cross-piece. It is preferably a groove with slightly convergent edges, the inside diameter of which is complementary to the inside diameter of the grooves 417, 418.

The cross-piece 420 is engaged on poles 416 by presenting the cross piece 420 vertically in line with a pole 416 by aligning the large diameter segment 424 on the summit of a pole 416. The cross-piece 420 is then lowered vertically onto the pole 416 until the cross-piece is aligned with one of the chosen grooves 417 or 418. The cross-piece 420 is then moved longitudinally along its length to bring the segment 425 facing the chosen groove 417, 418. The cross-piece 420 is then pivoted about the vertical axis of the above-mentioned pole 416 to engage the cut-out or groove 426 onto a groove 417, 418 in the second pole 416.

Those skilled in the art will understand that all that is necessary is to clamp and unclamp the screw 402 to fix or release a reference object on the panel 400, the said object thus being trapped between the upper surface of the plate 410 and the flared base 434 of the screw.

Preferably, the plate 410 is provided with markings on its upper surface to enable precise positioning of the reference object.

According to one particular non-limitative embodiment shown on the appended figures, the plate 410 thus has a central drilling 414. Preferably, the plate 410 also has a marking network or grooves on its upper surface. According to the preferred embodiment shown on the appended figures, it is thus planned to have a plurality of grooves 415 parallel to each other and parallel to the longitudinal direction O-O of the panel 400 and the tray 300, on the upper surface of the plate 410. It is also preferably planned to have a median straight groove 416 transverse to the above mentioned grooves 415.

As can be seen in the figures, the panel 400 is preferably fitted with a block 440 on its external longitudinal end, forming a stop for the reference object placed on the upper surface of the plate 410. A trunnion 450 adapted to hold a ball joint or an equivalent means 460 connected to a manipulation rod 470 is advantageously mounted on top of the block 440.

The use of a rod 470 selectively connected to trunnion 450 through trunnion 460 enables a manipulator to easily move the panel 400 in translation along the longitudinal axis O-O of the tray 300, by cooperation of pins 412 in the groove 311, 321, regardless of the height of the tray 300 on the columns 200.

The manipulator can thus follow any instruction provided, for example in a written manual provided to him or preferably from a microcomputer or even the central calculation and processing unit of the metal detector portal structure, so as to respect the required tests sequence.

As mentioned above, and those skilled in the art will understand after examining the appended figures, the rack conforming with this invention can be disassembled into small individual parts, and thus stored in a reasonably sized transport case. Such a case 500 is illustrated on the appended FIGS. 16 and 17. There may be many different embodiments of the layout of elements in the case reference 500. Therefore it will not be described in detail in the following.

Those skilled in the art will understand that the device conforming with this invention enables 1) precise and repetitive positioning of a reference object carried by the panel 400 with respect to the emitting and receiving coils of a portal structure under test, 2) precise and repetitive orientation of the reference object, 3) a measurement of the instantaneous or average transit time and/or speed through the portal structure under test, 4) a measurement of the hold time at the end of movement due to the sensor 350 before a new transit through the portal structure, 5) a simple connection with any central data saving unit, and 6) supply of complete information using a microcomputer or any equivalent means. As indicated previously, FIG. 19 diagrammatically shows a complete assembly of the detector system conforming with this invention comprising a rack 10 and a microcomputer 20 associated with a metal detector 30. The rack 10 is placed longitudinally inside the metal detector portal structure 30 in the middle of it. A reference part is placed on the panel 400 forming a cursor mounted free to move in translation on the tray 300 and driven by the rod 470. The height of the tray 300 on the columns 200 may be adjusted such that the tests can be performed from the floor level up to a height of the order of at least 1700 mm. All the operator needs to do is to follow the indications provided on the screen 22 of the microcomputer 200, possibly displayed on the display unit of the metal detector portal structure 30. The microcomputer 30 is programmed to output all test instructions in sequence. It then memorises the detected data. As mentioned above, test operations are checked by three sensors carried by the tray 300: 1) an entry sensor reference 346e, 336e in FIG. 19 placed close to the entry to the metal detector to detect when the reference part carried by the panel 400 enters into the portal structure, 2) an output sensor reference 346s, 336s in FIG. 19 placed close to the exit from the metal detector to detect when the reference part exits from the portal structure detection volume, and 3) a stop sensor 350 placed at the end of the trajectory of the reference part to detect when the reference part begins its return path through the test portal structure.

Obviously, this invention is not limited to the embodiment that have just been described, but covers every variant conforming with its spirit.

The invention claimed is:

1. Test device for metal detector portal structure, including a removable rack (10), said rack comprising
    a base (100),
    a plurality of columns (200),
    a tray (300) supported by the columns and adjustable in height on the columns,
    a panel (400) free to move on the tray (300) and capable of carrying a reference sample, and
    support and guide means for displacement of the panel (400) on the tray.

2. Device set forth in claim 1, further comprising means (337, 347, 348) of connection with a calculation and processing unit.

3. Device set forth in claim 1, further comprimising means (337, 347, 348) of connection with a microcomputer.

4. Device set forth in claim 1, further comprising means (337, 347, 348) of connection with a calculation and processing unit integrated to the metal detector portal structure.

5. Device set forth in claim 1, further comprising means (337, 347, 348) of connection with a calculation and processing unit suitable to provide a sequence of manipulation instructions for an operator, and to record and process information output from sensors (346, 350) supported on the removable rack.

6. Device set forth in claim 1, wherein the device is made entirely from a thermoplastic material.

7. Device set forth in claim 1, wherein the base (100) is for placing on a floor, said floor comprising means of receiving the base of the columns (200) on its upper surface.

8. Device set forth in claim 1, wherein the base (100) is about 770 mm long and about 300 mm wide.

9. Device set forth in claim 1, wherein the tray (300) is about 1700 m long and 300 mm wide.

10. Device set forth in claim 1, wherein the tray (300)is fitted with stops (316, 326) close to its ends.

11. Device set forth in claim 1, wherein the tray (300) is fixed at a required height, using cams (333, 343) on the columns (200).

12. Device set forth in claim 1, wherein the panel (400) is provided with means (412) complementary to the guide means (311, 321) provided on the tray (300).

13. Device set forth in claim 1, wherein panel (400) comprising a marking (414, 415, 416) on its upper surface.

14. Device set forth in claim 1, wherein the panel (400) is provided with a central drilling (414).

15. Device set forth in claim 1, wherein the panel (400) comprises a network of grooves (415) on its upper surface.

16. Device set forth in claim 1, wherein the panel (400) comprises several parallel longitudinal grooves (415).

17. Device set forth in claim 1, wherein the panel (400) is provided with a transverse groove (416).

18. Device set forth in claim 1, wherein the panel (400) holds a stop (440).

19. Device set forth in claim 1, further comprising a rod (470) associated with a ball joint (460) adapted to handle the displacement of a panel (400).

20. Device set forth in claim 1, further comprising a storage case (500) suitable to contain all disassembled elements from the rack.

21. Device set forth in claim 1, wherein the base (100) is fitted with orientation and positioning marker means (120, 122, 124, 126, 128) on its upper surface.

22. Device set forth in claim 21, wherein the positioning and orientation marker means comprise at least one cut-out (124, 126).

23. Device set forth in claim 21, wherein the base (100) comprises a central orifice (126).

24. Device set forth in claim 21, wherein the base (100) comprises at least one longitudinal straight cut-out (122, 124).

25. Device set forth in claim 21, wherein the base (100) comprises at least one straight marker groove (127, 128) on its upper face.

26. Device set forth in claim 21, wherein the base (100) comprises at least two grooves (127, 128) orthogonal to each other, on its upper surface.

27. Device set forth in claim 1, wherein, each said column (200) is formed by assembly of several tubular segments (220, 222, 224).

28. Device set forth in claim 27, wherein each said column (200) is about 1750 mm high.

29. Device set forth in claim 27, wherein ach said column (200) comprises graduations (223) with regular intervals.

30. Device set forth in claim 1, wherein the tray (300) is formed by the assembly of two coplanar plates (310, 320) fixed by side elements (330, 340).

31. Device set forth in claim 30, wherein shapes (313, 323) of adjacent ends of the two plates (310, 320) are complementary.

32. Device set forth in claim 30, wherein two plates (311, 321) are provided with an additional screw/nut system (314, 334, 344) with side elements (330, 340).

33. Device set forth in claim 32, wherein the screw/nut systems are assembled onto the plates (310, 320) and side attachment elements (330, 340) such that they cannot be separated.

34. Device set for in claim 1, further comprises removable means (416, 420, 430) forming a vice fixed on the panel (400).

35. Device set forth in claim 34, wherein the means forming the vice comprise two removable poles (416) associated with a cross-piece (420) that carries a clamping screw (430).

36. Device set forth in claim 35, wherein the poles (416) comprise at least two annular grooves (417, 418) for holding the cross-piece (420) at an adjustable height.

37. Device set forth in claim 35, wherein the cross-piece (420) comprises an elongated slot (422) with a widened segment (424) wider than the diameter of a pole (416) and a complementary narrowed segment (425) with the same diameter as a groove (417, 418) formed in the pole (416), and a side opening cut-out (426) complementary to a groove (417, 418) formed in a pole (416).

38. Device set forth in claim 1, wherein the tray (300) is fitted with a limit stop sensor (350) sensitive to passage of a panel (400).

39. Device set forth in claim 38, wherein the limit stop sensor (350) is an electrical switch.

40. Device set forth in claim 1, wherein the tray (300) is provided with means (311, 321) for guiding a panel (400) in translation.

41. Device set forth in claim 40, wherein the guide means consist of comprise straight grooves (311, 321).

* * * * *